(12) United States Patent
Nakao et al.

(10) Patent No.: US 12,341,354 B2
(45) Date of Patent: Jun. 24, 2025

(54) CONTACTLESS POWER FEEDING APPARATUS

(71) Applicant: OMRON Corporation, Kyoto (JP)

(72) Inventors: Goro Nakao, Kyoto (JP); Hiroaki Ota, Kyoto (JP); Yuki Ito, Kyoto (JP); Kenichi Tabata, Kyoto (JP); Atsushi Nomura, Kyoto (JP); Daiki Ando, Kyoto (JP); Ken Onozaka, Kyoto (JP); Yusuke Kawai, Kyoto (JP); Mitsunori Sugiura, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 18/058,060

(22) Filed: Nov. 22, 2022

(65) Prior Publication Data

US 2023/0187983 A1    Jun. 15, 2023

(30) Foreign Application Priority Data

Dec. 14, 2021   (JP) ................................ 2021-202822

(51) Int. Cl.
   *H02J 50/80*   (2016.01)
   *H02J 50/12*   (2016.01)
(52) U.S. Cl.
   CPC .............. *H02J 50/80* (2016.02); *H02J 50/12* (2016.02)
(58) Field of Classification Search
   CPC ............. H02J 50/10; H02J 50/12; H02J 50/80
   See application file for complete search history.

(56) References Cited

U.S. PATENT DOCUMENTS

| | | | | |
|---|---|---|---|---|
| 2007/0252441 | A1* | 11/2007 | Yamauchi | H02M 3/01 307/104 |
| 2012/0043826 | A1* | 2/2012 | Saitoh | H01F 38/14 307/104 |
| 2012/0049644 | A1* | 3/2012 | Choi | H02J 50/12 307/104 |
| 2016/0197494 | A1* | 7/2016 | Kwon | H04B 5/79 307/104 |
| 2019/0305600 | A1* | 10/2019 | Nakao | H02J 50/12 |
| 2020/0412171 | A1* | 12/2020 | Hanabusa | H02J 7/00712 |

FOREIGN PATENT DOCUMENTS

WO    2006/022365 A1    3/2006

* cited by examiner

*Primary Examiner* — Rexford N Barnie
*Assistant Examiner* — Joseph N Inge
(74) *Attorney, Agent, or Firm* — METROLEX IP LAW GROUP, PLLC; Robert L. Scott, Esq.

(57) ABSTRACT

A power transmitting apparatus included in the contactless power feeding apparatus includes a power supply circuit that supplies AC power having a predetermined drive frequency to a transmission coil for supplying power to a power receiving apparatus, a first coil and a first capacitor that are connected between the power supply circuit and the transmission coil, a second capacitor that is connected at first end to the first capacitor and is connected at a second end to the second end of the transmission coil, and a control circuit. Also, the power receiving apparatus includes a receiver coil for receiving power, and a resonant circuit that includes a resonance capacitor that resonates together with the receiver coil. Also, the control circuit of the power transmitting apparatus controls the power supply circuit such that the predetermined drive frequency falls within a predetermined frequency range including a resonance frequency of the resonant circuit.

2 Claims, 8 Drawing Sheets

CONTACTLESS POWER FEEDING APPARATUS

CROSS-REFERENCES TO RELATED APPLICATIONS

This application claims priority to Japanese Patent Application No. 2021-202822 filed Dec. 14, 2021, the entire contents of which are incorporated herein by reference.

FIELD

The present disclosure relates to a contactless power feeding apparatus.

BACKGROUND

Heretofore, techniques for so-called contactless power feeding (also referred to as "wireless power feeding") in which power is transmitted through a space without using metal contacts and so on have been studied.

As one such contactless power feeding technique, a technique is known in which power is transmitted from a power transmitting-side apparatus to a power receiving side apparatus via a power transmitting side coil and a power receiving-side coil. In particular, a technique has been proposed for reducing a high frequency component that is unnecessarily radiated from a primary-side coil and for achieving high efficiency and miniaturization (see WO 2006/022365). In a contactless power transmitting apparatus disclosed in WO 2006/022365, a primary-side series resonant circuit is formed by a capacitor that resonates with a primary-side coil being connected in series to the primary-side coil. An L-type resonant circuit including another coil and a capacitor that resonates with the primary-side coil is inserted between the primary-side series resonant circuit and a driving circuit. Also, the L-type resonant circuit and the primary-side series resonant circuit are connected in series.

WO 2006/022365 is an example of the related art.

However, with the technique described above, there are cases where it is difficult to maintain a so-called constant voltage output operation in which the output voltage of a power receiving side apparatus is substantially kept constant even if the resistance value of a load circuit connected to the power receiving side apparatus changes. Also, when the distance between a power transmitting-side coil and a power receiving-side coil increases, delay of phase of a current flowing through the power transmitting-side coil from the phase of an AC voltage applied to the power transmitting-side coil becomes prominent. As a result, the switching loss of an inverter circuit that supplies AC power to the power transmitting-side coil increases, and the power transmission efficiency decreases.

Therefore, one or more embodiments aims to provide a contactless power feeding apparatus that may improve power transmission efficiency while enabling a constant voltage output operation.

SUMMARY

A contactless power feeding apparatus according to one or more embodiments may include a power transmitting apparatus and a power receiving apparatus to which power is contactlessly transmitted from the power transmitting apparatus. In the contactless power feeding apparatus, the power transmitting apparatus includes: a transmission coil for supplying power to the power receiving apparatus; a power supply circuit configured to supply AC power having a predetermined drive frequency to the transmission coil; a first capacitor connected between the power supply circuit and a first end of the transmission coil; a first coil connected between the power supply circuit and the first end or a second end of the transmission coil: a second capacitor that is connected at a first end to the first capacitor, and is connected at a second end to the second end of the transmission coil; and a control circuit configured to control the power supply circuit such that AC power having the predetermined drive frequency is supplied to the transmission coil. Also, the power receiving apparatus includes a receiver coil for receiving power via the transmission coil of the power transmitting apparatus, and a resonant circuit including a resonance capacitor that resonates together with the receiver coil. The control circuit is configured to control the power supply circuit such that the predetermined drive frequency falls within a predetermined frequency range including a resonance frequency of the resonant circuit. By employing such a configuration, the contactless power feeding apparatus may improve power transmission efficiency while enabling a constant voltage output operation.

In the power transmitting apparatus of the contactless power feeding apparatus, an inductance of the transmission coil, an electrostatic capacitance of the first capacitor, and the electrostatic capacitance of the second capacitor are set such that a closed loop resonance frequency of a closed loop constituted by the transmission coil, the first capacitor, and the second capacitor is higher than the predetermined drive frequency. By employing such a configuration, the contactless power feeding apparatus may appropriately adjust the amount of delay in the phase of a current flowing through the transmission coil relative to the phase of a voltage of AC power to be supplied to the transmission coil, and as a result, the switching loss in the power supply circuit may be reduced.

DETAILED DESCRIPTION

Hereinafter, a contactless power feeding apparatus according to one or more embodiments will be described with reference to the drawings. In the contactless power feeding apparatus according to one or more embodiments, a power transmitting-side apparatus (hereinafter, simply referred to as a "power transmitting apparatus") includes a first capacitor that is connected between one end of a coil for power transmission (hereinafter, simply referred to as a "transmission coil") and a power supply circuit that supplies AC power to the transmission coil, and also includes a first coil that is connected in series to the first capacitor and a second capacitor that is connected at one end to a node between the first capacitor and the first coil, and is connected at the other end to the other end of the transmission coil. Also, in the contactless power feeding apparatus, the frequency of AC power to be supplied to the transmission coil is controlled so as to fall within a predetermined frequency range including a resonance frequency of a resonant circuit including a coil for power reception (hereinafter, simply referred to as a "receiver coil") that is included in a power receiving side apparatus (hereinafter, simply referred to as a "power receiving apparatus"). Below, the frequency of AC power supplied to the transmission coil may simply be referred to as a "drive frequency".

Figure 1:
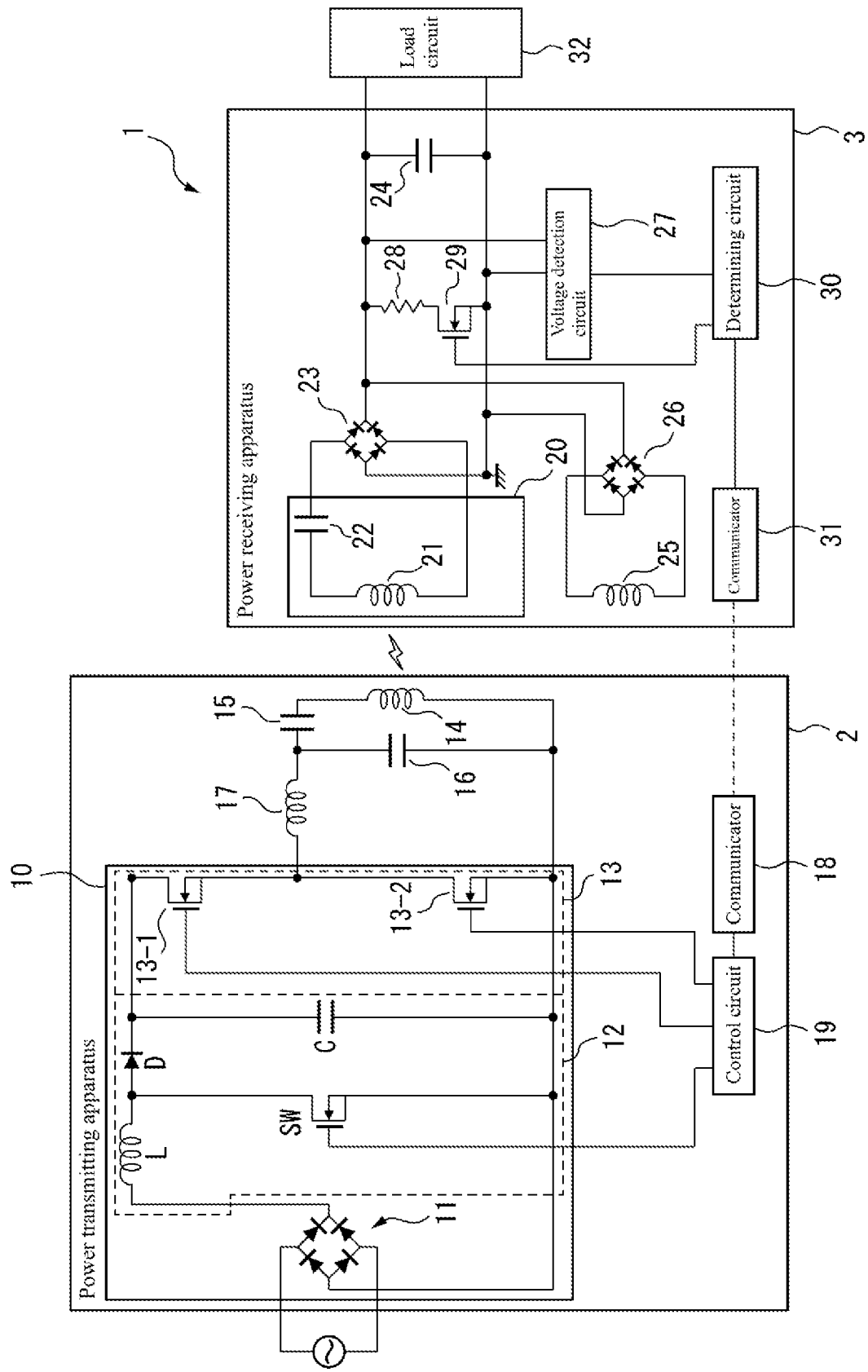
FIG. 1 is a schematic configuration diagram illustrating a contactless power feeding apparatus according to one or more embodiments.

FIG. 1 is a schematic configuration diagram of the contactless power feeding apparatus according to one or more embodiments. As shown in FIG. 1, a contactless power feeding apparatus 1 includes a power transmitting apparatus 2 and a power receiving apparatus 3 to which power is contactlessly transmitted through a space from the power transmitting apparatus 2. The power transmitting apparatus 2 includes a power supply circuit 10, a transmission coil 14, a first capacitor 15, a second capacitor 16, a first coil 17, a communicator 18, and a control circuit 19. On the other hand, the power receiving apparatus 3 includes a resonant circuit 20 including a receiver coil 21 and a resonance capacitor 22, a first rectifier circuit 23, a smoothing capacitor 24, a subcoil 25, a second rectifier circuit 26, a voltage detection circuit 27, a resistor 28, a switching element 29, a determining circuit 30, and a communicator 31. Also, the power receiving apparatus 3 is connected to a load circuit 32, and the power received and converted by the power receiving apparatus 3 to DC power is output to the load circuit 32.

First, the power transmitting apparatus 2 will be described. The power supply circuit 10 supplies AC power having a predetermined drive frequency and an adjustable voltage to the transmission coil 14. Accordingly, the power supply circuit 10 includes a full-wave rectifier circuit 11, a power factor improvement circuit 12, and an inverter 13.

The full-wave rectifier circuit 11 supplies power having a predetermined pulsating voltage. Accordingly, the full-wave rectifier circuit 11 includes four diodes that are connected in a bridge connection, and is connected to a commercial AC power supply. Also, the full-wave rectifier circuit 11 rectifies the AC power supplied from the AC power supply so as to convert the AC power to power having a pulsating voltage, and outputs the resultant power to the power factor improvement circuit 12.

The power factor improvement circuit 12 converts the voltage of power output from the full-wave rectifier circuit 11 to DC power having a voltage in accordance with the control performed by the control circuit 19, and outputs the resultant DC power. Therefore, a DC power supply is constituted by the AC power supply, the full-wave rectifier circuit 11, and the power factor improvement circuit 12.

The power factor improvement circuit 12 can be configured similarly to any of various power factor improvement circuits in which an output voltage can be adjusted in accordance with control performed by the control circuit 19. In the present embodiment, the power factor improvement circuit 12 includes a coil that is connected, at one end, in series to a positive electrode terminal of the full-wave rectifier circuit 11, and a diode that is connected between the other end of the coil and the inverter 13 such that the direction from the coil to the inverter 13 is a forward direction. The power factor improvement circuit 12 further includes a switching element that is connected at one end to a node between the coil and the diode, and is connected at the other end to a negative electrode terminal of the full-wave rectifier circuit 11, and a smoothing capacitor that is connected in parallel to the switching element, the diode being interposed therebetween. As a result of the control circuit 19 controlling the on/off duty ratio of the switching element, the output voltage of the power factor improvement circuit 12 is controlled. Note that the power factor improvement circuit 12 may also be configured similarly to a power factor improvement circuit of a power transmitting apparatus described in JP 6390808B.

The inverter 13 converts the DC power output from the power factor improvement circuit 12 to AC power having a drive frequency corresponding to the on/off switching cycle of switching elements 13-1 and 13-2. Then, the inverter 13 outputs the resultant AC power to the transmission coil 14 via the first capacitor 15, the second capacitor 16, and the first coil 17.

Accordingly, the inverter 13 includes the two switching elements 13-1 and 13-2. The two switching elements 13-1 and 13-2 can each be an n-channel MOS FET, for example. The inverter 13 is configured as a so-called half bridge circuit. That is, the switching element 13-1 and the switching element 13-2 are connected in series between the positive electrode terminal and negative electrode terminal of the full-wave rectifier circuit 11 via the power factor improvement circuit 12. Also, in the present embodiment, the switching element 13-1 is connected on the positive electrode side of the full-wave rectifier circuit 11, and the switching element 13-2 is connected on the negative electrode side of the full-wave rectifier circuit 11. Also, the drain terminal of the switching element 13-1 is connected to the positive electrode terminal of the full-wave rectifier circuit 11 via the power factor improvement circuit 12, and the source terminal of the switching element 13-1 is connected to the drain terminal of the switching element 13-2. Also, the source terminal of the switching element 13-2 is connected to the negative electrode terminal of the full-wave rectifier circuit 11 via the power factor improvement circuit 12. Moreover, the source terminal of the switching element 13-1 and the drain terminal of the switching element 13-2 are connected to one end of the transmission coil 14 via the first coil 17 and the first capacitor 15, and the source terminal of the switching element 13-2 is connected to the other end of the transmission coil 14.

Also, the gate terminals of the switching elements 13-1 and 13-2 are connected to the control circuit 19. Moreover, in order to ensure that a switching element is turned on when a voltage for turning on the switching element is applied to the gate terminal thereof, the gate terminals of the switching elements 13-1 and 13-2 may be respectively connected to the own source terminals via resistors. Also, the 13-1 and 13-2 are alternately switched on and off according to control signals from the control circuit 19. In the present embodiment, the 13-1 and 13-2 are alternately switched on and off such that when the switching element 13-1 is on, the switching element 13-2 is off, and conversely, when the switching element 13-2 is on, the switching element 13-1 is off. Accordingly, DC power supplied from the power factor improvement circuit 12 is converted to AC power having a drive frequency corresponding to the on/off switching cycle of the switching elements, and the resultant AC power is supplied to the transmission coil 14.

Note that the inverter 13 is not limited to the configuration described in the above embodiment. For example, the inverter 13 may also be configured as a full bridge circuit in which four switching elements are connected in a full-bridge connection.

The first coil 17 is connected in series between the inverter 13 and the transmission coil 14 along with the first capacitor 15. That is, one end of the first coil 17 is connected to one of the two output terminals of the inverter 13, that is, a node between the source terminal of the switching element 13-1 and the drain terminal of the switching element 13-2, and the other end of the first coil 17 is connected to one end of the first capacitor 15. Also, the other end of the first capacitor 15 is connected to one end of the transmission coil 14. Note that it m preferable that the first coil 17 is disposed so as to not electromagnetically couple with the transmission coil 14 and coils included in the power receiving apparatus 3.

Moreover, one end of the second capacitor 16 is connected to a node between the other end of the first coil 17 and the one end of the first capacitor 15, and the other end of the second capacitor 16 is connected to the other end of the transmission coil 14 and the other output terminal of the inverter 13, that is the source terminal of the switching element 13-2.

As a result of the first capacitor 15, the second capacitor 16, and the first coil 17 being provided as described above, a delay in the phase of the current flowing through the transmission coil 14 relative to the phase of the voltage supplied to the transmission coil 14 is adjusted such that the switching loss of the switching elements of the inverter 13 is reduced. Moreover, the contactless power feeding apparatus 1 can perform a constant voltage output operation. Note that the settings of the electrostatic capacitances of the first capacitor 15 and the second capacitor 16 and the inductance of the first coil 17 will be described in detail later.

The transmission coil 14 transmits AC power supplied from the inverter 13 of the power supply circuit 10 via the first coil 17 and the first capacitor 15 to the resonant circuit 20 of the power receiving apparatus 3 through a space.

Every time a wireless signal is received from the communicator 31 of the power receiving apparatus 3, the communicator 18 extracts output voltage information indicating an output voltage of the power receiving apparatus 3 from the wireless signal, and outputs the extracted output voltage information to the control circuit 19. Accordingly, the communicator 18 includes an antenna for receiving wireless signals in accordance with a predetermined wireless communication standard, and a communication circuit that demodulates the wireless signals, for example. Note that the predetermined wireless communication standard may be ISO/IEC 15693, ZigBee (registered trademark), or Bluetooth (registered trademark), for example.

The control circuit 19 includes a nonvolatile memory circuit and a volatile memory circuit, a computation circuit, an interface circuit for connection to another circuit, and a driving circuit for outputting control signals to the switching elements, for example. Also, the control circuit 19 controls, every time output voltage information is received from the communicator 18, the voltage of AC power supplied from the power supply circuit 10 to the transmission coil 14 according to the output voltage information.

The control circuit 19 controls the power factor improvement circuit 12 such that the output voltage of the power receiving apparatus 3 falls within a preset output voltage allowable range. For example, if the output voltage of the power receiving apparatus 3, which is indicated by the output voltage information, is higher than an upper limit of an allowable range, the control circuit 19 decreases the duty ratio of the switching element of the power factor improvement circuit 12. Conversely, if the output voltage of the power receiving apparatus 3, which is indicated by the output voltage information, is lower than a lower limit of the allowable range, the control circuit 19 increases the duty ratio of the switching element of the power factor improvement circuit 12. Also, if the output voltage of the power receiving apparatus 3, which is indicated by the output voltage information, falls within the allowable range, the control circuit 19 keeps the duty ratio of the switching element of the power factor improvement circuit 12 constant without change.

Moreover, the control circuit 19 turns the 13-1 and 13-2 of the inverter 13 on and off such that the frequency of AC power to be supplied from the inverter 13 to the transmission coil 14 is a predetermined drive frequency. That is, the control circuit 19 controls the switching elements 13-1 and 13-2 such that the switching element 13-1 and the switching element 13-2 are alternately turned on, and the period in which the switching element 13-1 is on, in one cycle time corresponding to the predetermined drive frequency, is equal to the period in which the switching element 13-2 is on. Note that the control circuit 19 may also provide a dead time in which both of the switching elements are off when switching on/off of the switching element 13-1 and the switching element 13-2 in order to prevent the AC power supply from being short-circuited due to the switching element 13-1 and the switching element 13-2 being on at the same time.

Next, the power receiving apparatus 3 will be described. The resonant circuit 20 is an LC resonant circuit in which the receiver coil 21 and the resonance capacitor 22 are connected in series. Also, one end of the receiver coil 21 included in the resonant circuit 20 is connected to one input terminal of the first rectifier circuit 23 via the resonance capacitor 22. Also, the other end of the receiver coil 21 is connected to the other input terminal of the first rectifier circuit 23.

The receiver coil 21 receives power from the transmission coil 14 by resonating, together with the resonance capacitor 22, with an AC current flowing through the transmission coil 14 of the power transmitting apparatus 2. Also, the receiver coil 21 outputs the received power to the first rectifier circuit 23 via the resonance capacitor 22. Note that the number of turns of the receiver coil 21 may be the same as or different from the number of turns of the transmission coil 14 of the power transmitting apparatus 2.

The resonance capacitor 22 is connected in series to the receiver coil 21. That is, one end of the resonance capacitor 22 is connected to one end of the receiver coil 21, and the other end thereof is connected to the first rectifier circuit 23. Also, the resonance capacitor 22 outputs the received power to the first rectifier circuit 23 by resonating together with the receiver coil 21.

The first rectifier circuit 23 can be configured as a full-wave rectifier circuit including four diodes that are in a bridge connection, for example. One of two terminals on an input side of the first rectifier circuit 23 is connected to the resonance capacitor 22, and the other of the two terminals on the input side is connected to the receiver coil 21. Also, one of two terminals on an output side of the first rectifier circuit 23 is connected to one end of the smoothing capacitor 24, and the other of the two terminals on the output side is connected to the other end of the smoothing capacitor 24, and is also grounded. Also, the first rectifier circuit 23 converts AC power output from the resonant circuit 20 to DC power by rectifying the AC power together with the smoothing capacitor 24.

The smoothing capacitor 24 converts, together with the first rectifier circuit 23 or the second rectifier circuit 26, AC power received via the resonant circuit 20 or the subcoil 25 to DC power. Also, the smoothing capacitor 24 outputs the resultant DC power to the load circuit 32. Accordingly, one end of the smoothing capacitor 24 is connected to one of two terminals on the output side of the first rectifier circuit 23, one of two terminals on an output side of the second rectifier circuit 26, and one end of the load circuit 32. Also, the other end of the smoothing capacitor 24 is connected to the other of the two terminals on the output side of the first rectifier circuit 23, the other of the two terminals on the output side of the second rectifier circuit 26, and the other end of the load circuit 32.

The subcoil 25 is provided so as to be able to electromagnetically couple with the receiver coil 21 of the resonant circuit 20. For example, the subcoil 25 and the receiver coil 21 are wound around the same core. Also, the two ends of the subcoil 25 are respectively connected to two input terminals of the second rectifier circuit 26. As a result of providing such a subcoil 25, the voltage applied to the resonant circuit 20 is suppressed from excessively increasing. For example, when the load of the load circuit 32 increases, if the contactless power feeding apparatus 1 tries to maintain a constant voltage output operation, and the voltage applied to the receiver coil 21 increases, the voltage applied to the subcoil 25 also increases following the increase in the voltage applied to the receiver coil 21. Then, if the voltage applied by the subcoil 25 exceeds the output voltage of the power receiving apparatus 3, some of the transmitted power flows from the subcoil 25 to the smoothing capacitor 24 via the second rectifier circuit 26, and therefore an excessive voltage is suppressed from being applied to the resonant circuit 20. On the other hand, when the voltage output from the resonant circuit 20 to the load circuit 32 via the first rectifier circuit 23 and the smoothing capacitor 24 is of a certain magnitude, the voltage between two terminals of the smoothing capacitor 24 also becomes larger than the voltage between two output terminals of the second rectifier circuit 26 due to the voltage between the two terminals of the subcoil 25. Therefore, a current will not flow from the subcoil 25 to the smoothing capacitor 24. As a result, when the contactless power feeding apparatus 1 continues a constant voltage output operation, the subcoil 25 will not influence the constant voltage output operation.

Note that it may be preferable that the number of turns ns of the subcoil 25 is set such that the number of turns ns of the subcoil 25 is smaller than the number of turns nm of the receiver coil 21. Moreover, it may be preferable that the ratio (nm/ns) of the number of turns nm of the receiver coil 21 to the number of turns ns of the subcoil 25 is set such that the envisioned maximum value of the voltage wave height of the subcoil 25 is less than or equal to an output voltage of the smoothing capacitor 24 when the contactless power feeding apparatus 1 is executing a constant voltage output operation. The output voltage is set according to the specification of the load circuit 32.

The second rectifier circuit 26 can be configured as a full-wave rectifier circuit including four diodes that are in a bridge connection, for example. Note that the second rectifier circuit 26 may be a rectifier circuit of another type. One of the two terminals of the second rectifier circuit 26 on the input side is connected to one end of the subcoil 25, and the other of the two terminals is connected to the other end of the subcoil 25. Also, one of the two terminals of the second rectifier circuit 26 on the output side is connected to one end of the smoothing capacitor 24, and the other of the two terminals on the output side is grounded. Also, if the voltage between the two terminals of the second rectifier circuit 26 on the output side according to the voltage applied between the two terminals of the subcoil 25 is larger than the voltage between two terminals of the smoothing capacitor 24, the second rectifier circuit 26 outputs power output from the subcoil 25 to the smoothing capacitor 24.

The voltage detection circuit 27 measures, at predetermined intervals, the voltage between two terminals of the smoothing capacitor 24, that is, the output voltage of the power receiving apparatus 3 output to the load circuit 32. The voltage detection circuit 27 may be any of various known voltage detection circuits that can detect a DC voltage, for example. Also, the voltage detection circuit 27 outputs a voltage detection signal indicating the measured value of the output voltage to the determining circuit 30.

The resistor 28 is connected to the first rectifier circuit 23 and the second rectifier circuit 26 so as to be, in combination with the switching element 29, in parallel to the load circuit 32. That is, one end of the resistor 28 is connected to a node between one of two terminals of the first rectifier circuit 23 on an output side and one of two terminals of the second rectifier circuit 26 on an output side, and one end of the smoothing capacitor 24, and the other end of the resistor 28 is grounded via the switching element 29. Also, by turning on the switching element 29, a current output from the first rectifier circuit 23 or the second rectifier circuit 26 flows through the resistor 28. Therefore, by switching the switching element 29 on and off, the same effect as the change in the resistance of the load circuit 32 connected to the power receiving apparatus 3 can be obtained in a pseudo manner.

The switching element 29 is a MOS FET, for example, and is connected to the first rectifier circuit 23 and the second rectifier circuit 26 so as to be, in combination with the resistor 28, in parallel to the load circuit 32. The switching element 29, when turned off, does not allow a current from the first rectifier circuit 23 and the second rectifier circuit 26 to flow to the resistor 28, and, when turned on, allows a current from the first rectifier circuit 23 and the second rectifier circuit 26 to flow to the resistor 28.

The determining circuit 30 determines, at predetermined intervals, whether or not the measured value of the output voltage falls within an allowable range of the output voltage, based on a measured value of an output voltage received from the voltage detection circuit 27. Moreover, the determining circuit 30, at predetermined intervals, generates output voltage information indicating the measured value of the output voltage, and notifies the communicator 31 of the generated output voltage information. Accordingly, the determining circuit 30 includes a memory circuit for storing the allowable range of the output voltage, a computation circuit that compares the measured value of the output voltage with the allowable range, and a control circuit for turning the 29 on and off, for example.

While the measured value of the output voltage is out of the allowable range of the output voltage, the determining circuit 30 switches the switching element 29 on/off at a fixed cycle. Accordingly, the resistance value of the entire circuit including the load circuit 32 connected to the power receiving apparatus 3 changes at the fixed cycle. Therefore, the determining circuit 30 can determine whether or not the contactless power feeding apparatus 1 is performing a constant voltage output operation by determining whether or not the measured value of the output voltage is substantially the same while switching the switching element 29 on/off. Therefore, the determining circuit 30 switches the switching element 29 on/off in a period in which the measured value of the output voltage is out of the allowable range of the output voltage. On the other hand, when the measured value of the output voltage falls within the allowable range of the output voltage, the determining circuit 30 keeps the switching element 29 turned off.

The communicator 31 generates, at predetermined transmission intervals, a wireless signal including output voltage information received from the determining circuit 30, and transmits the wireless signal to the communicator 18 of the power transmitting apparatus 2. Accordingly, the communicator 31 includes a communication circuit that generates wireless signals in accordance with a predetermined wireless communication standard, and an antenna for outputting the wireless signals, for example. Note that the predetermined wireless communication standard may be ISO/IEC 15693, ZigBee (registered trademark), or Bluetooth (registered trademark), for example, similarly to the communicator 18.

In the following, operations of the contactless power feeding apparatus 1 will be described in detail.

In the present embodiment, the control circuit 19 of the power transmitting apparatus 2 controls the voltage of AC power to be supplied from the power supply circuit 10 to the transmission coil 14 based on output voltage information received from the communicator 18 such that the contactless power feeding apparatus 1 continues a constant voltage output operation, and the output voltage of the power receiving apparatus 3 is included in an allowable range. In the following, the output voltage of the power receiving apparatus 3 may simply be referred to as an "output voltage".

Here, it may be preferable that, in order for the contactless power feeding apparatus 1 to perform a constant voltage output operation, in the vicinity of the drive frequency of AC power supplied from the power supply circuit 10 to the transmission coil 14, a change in the output voltage relative to a change in the drive frequency is small. If the change in the output voltage relative to the change in the drive frequency is large, the power transmission efficiency changes when there is a slight change in the positional relationship between the transmission coil 14 and receiver coil 21, or when there is a slight change in the circuit constants of the elements of the power transmitting apparatus 2 or the power receiving apparatus 3. Moreover, it may be preferable that a maximum value is present in frequency characteristics of the output voltage at the drive frequency or a frequency in the vicinity thereof, in order to improve the power transmission efficiency.

Figure 2:
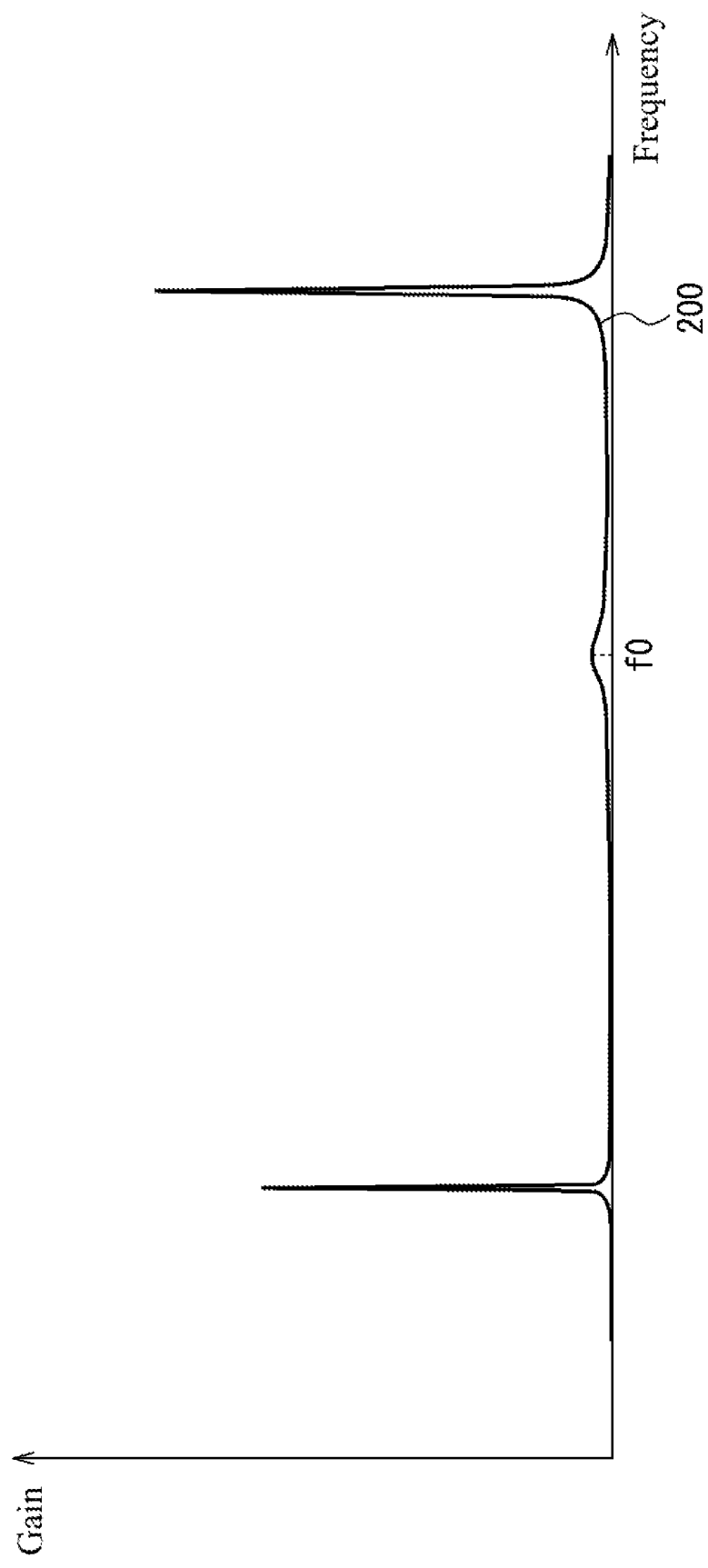
FIG. 2 is a schematic diagram illustrating an example of frequency characteristics of a gain regarding power to be transmitted, in a contactless power feeding apparatus.

FIG. 2 is a schematic diagram illustrating an example of the frequency characteristics of a gain regarding power to be transmitted, in the contactless power feeding apparatus 1. In FIG. 2, the horizontal axis shows the frequency, and the vertical axis shows the gain. Also, a graph 200 shows an example of the frequency characteristics of the gain. In the frequency characteristics 200, the gain attains maximum values at three frequencies different to each other. The change in gain relative to the change in frequency is moderate in the vicinity of a frequency f0, out of the frequencies at which the gain attains maximum values, relative to the vicinities of the other frequencies at which the gain attains maximum values. Therefore, it may be preferable that the inverter 13 of the power supply circuit 10 is controlled such that the drive frequency is at the frequency f0 or a frequency in the vicinity thereof. The frequency f0 is a resonance frequency of the resonant circuit 20 of the power receiving apparatus 3. The reason why the frequency f0 is a resonance frequency of the resonant circuit 20 will be described below.

Figure 3:
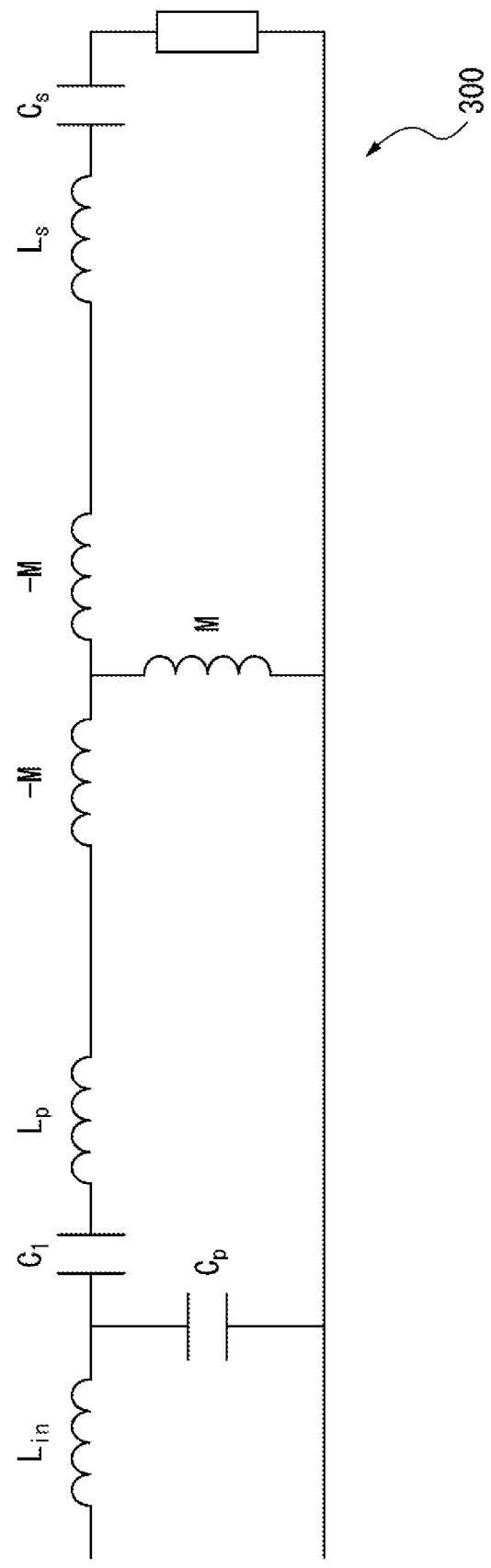
FIG. 3 is an equivalent circuit diagram illustrating a transmission coil, a first capacitor, a second capacitor, and a first coil of a power transmitting apparatus and a resonant circuit of a power receiving apparatus.

FIG. 3 is an equivalent circuit diagram of the transmission coil 14, the first capacitor 15, the second capacitor 16, and the first coil 17 of the power transmitting apparatus 2, and the resonant circuit 20 of the power receiving apparatus 3. In an equivalent circuit 300, a parameter $L_{in}$ represents an inductance of the first coil 17. Also, parameters $C_1$ and $C_p$ respectively represent an electrostatic capacitance of the first capacitor 15 and an electrostatic capacitance of the second capacitor 16. Moreover, a parameter $L_p$ and a parameter $L_s$ respectively represent an inductance of the transmission coil 14 and an inductance of the receiver coil 21, and a parameter $C_s$ represents an electrostatic capacitance of the resonance capacitor 22. Furthermore, a parameter M is a mutual inductance between the transmission coil 14 and the receiver coil 21. Note that, when the degree of coupling between the transmission coil 14 and the receiver coil 21 is denoted as k, $M=k(L_p L_s)^{1/2}$.

The F-matrix of the equivalent circuit 300 is represented by the following equation.

[Equation 1]

$$\begin{pmatrix} V_1 \\ I_1 \end{pmatrix} = F\begin{pmatrix} V_2 \\ I_2 \end{pmatrix} = \begin{pmatrix} A & B \\ C & D \end{pmatrix}\begin{pmatrix} V_2 \\ I_2 \end{pmatrix} \quad (1)$$

$F(\omega, L_{in}, C_p, C_1, L_p, L_s, k, C_s) :=$ $$\begin{bmatrix} 1 & 1i \cdot \omega \cdot L_{in} \\ 0 & 1 \end{bmatrix} \begin{bmatrix} 1 & 0 \\ 1i \cdot \omega \cdot C_p & 1 \end{bmatrix} \begin{bmatrix} 1 & \frac{1}{1i \cdot \omega \cdot C_1} \\ 0 & 1 \end{bmatrix} \cdot$$

$$\begin{bmatrix} \frac{1}{k} \cdot \sqrt{\frac{L_p}{L_s}} & \frac{1i \cdot \omega \cdot (1-k^2) \cdot \sqrt{L_p \cdot L_s}}{k} \\ \frac{1}{1i \cdot \omega \cdot k \cdot \sqrt{L_p \cdot L_s}} & \frac{1}{k} \cdot \sqrt{\frac{L_s}{L_p}} \end{bmatrix} \cdot \begin{bmatrix} 1 & \frac{1}{1i \cdot \omega \cdot C_s} \\ 0 & 1 \end{bmatrix}$$

Note that a parameter $\omega$ is an angular frequency corresponding to the drive frequency f, and $\omega = 2\pi f$.

Therefore, a terminal constant A is represented by the following equation. Note that the terminal constant A represents a transfer characteristic of a ratio (V1/V2) of the voltage V1 (in the following, referred to as an "input voltage V1", for convenience) of AC power applied to the transmission coil 14 via the first capacitor 15, the second capacitor 16, and the first coil 17, relative to an output voltage V2 of the resonant circuit 20, when an output current I2 of the resonant circuit 20 is zero.

[Equation 2]

$$A = \frac{-2 \cdot C_1 \cdot C_P \cdot L_{in} \cdot L_p \cdot \omega^4 + (2 \cdot C_1 \cdot L_p + (C_p + C_1) \cdot L_{in}) \cdot \omega^2 - 1}{C_1 \cdot \omega^2 \cdot k \cdot \sqrt{L_p \cdot L_s}} \quad (2)$$

Moreover, a terminal constant B representing a transfer characteristic of a ratio (V1/I2) of the input voltage V1 relative to the output current I2 when an output voltage V2 of the resonant circuit 20 is zero is represented by the following equation.

[Equation 3]

$$B = \frac{L_p \cdot L_s \cdot C_p \cdot L_{in} \cdot (k^2 - 1)}{k \cdot \sqrt{L_p \cdot L_s}} \cdot \omega^3 + \\
\frac{(L_p \cdot L_s \cdot C_1 \cdot (1 - k^2) + L_{in} \cdot L_s \cdot (C_p + C_1))}{C_1 \cdot k \cdot \sqrt{L_p \cdot L_s}} \cdot \omega - \\
\frac{L_s}{C_1 \cdot k \cdot \sqrt{L_p \cdot L_s}} \cdot \frac{1}{\omega} + \frac{C_1 \cdot C_p \cdot L_{in} \cdot L_p}{C_1 \cdot C_s \cdot k \cdot \sqrt{L_p \cdot L_s}} \cdot \omega - \\
\frac{C_1 \cdot L_p + (C_p + C_1) \cdot L_{in}}{C_1 \cdot C_s \cdot k \cdot \sqrt{L_p \cdot L_s}} \cdot \frac{1}{\omega} + \frac{1}{C_1 \cdot C_s \cdot k \cdot \sqrt{L_p \cdot L_s}} \cdot \frac{1}{\omega^3}$$

(3)

Also, a gain G of the output voltage of the resonant circuit 20 is represented by the following equation.

[Equation 4]

$$G = \frac{1}{A + \frac{B}{R}} \quad (4)$$

Here, a parameter R is an AC-equivalent resistance value of the load circuit 32.

As shown in Equation (4), the gain G is determined by the terminal constant A, the terminal constant B, and the AC-equivalent resistance value of the load circuit 32. Among these parameters, as shown in Equation (2), the terminal constant A is determined only by the circuit constants of the elements on the power transmitting apparatus 2 side, and two angular frequencies w are present at which the terminal constant A is zero. Moreover, the two angular frequencies at which the terminal constant A is zero are angular frequencies determined by a fourth-order or quadratic term of the angular frequency ω, and therefore the terminal constant A rapidly changes following the change in angular frequency in the vicinities of the two angular frequencies.

On the other hand, with respect to the terminal constant B, a third or greater order term of the angular frequency ω is present, as shown in Equation (3), and therefore at least three angular frequencies ω are present at which the terminal constant B is zero. Also, one of the angular frequencies at which the terminal constant B is zero corresponds to the frequency f0 in FIG. 2. Note that it may be preferable that the circuit constants of the coils and the capacitors of the power transmitting apparatus 2 and the circuit constants of the receiver coil 21 and the resonance capacitor 22 of the power receiving apparatus 3 are set such that the terminal constant B is larger than the terminal constant A at one angular frequency at which the terminal constant B is not zero. By setting the circuit constants of the elements as described above, the terms of the terminal constant A are dominant with respect to the gain G, in the vicinities of angular frequencies at which the terminal constant B is zero and that are sufficiently apart from angular frequencies at which the terminal constant A is zero, and the terms of the terminal constant B are dominant with respect to the gain G, at other angular frequencies at which the terminal constant B is not zero. Therefore, the value of gain at the frequency f0 in FIG. 2 is relatively larger than the gain at a frequency in the vicinity of the frequency f0.

If Equation (3) is solved with respect to the square of the angular frequency while ignoring the term of $k^2$, assuming that the terminal constant B is zero and $1 \gg k^2$ is established in Equation (3), the following solutions are obtained.

[Equation 5]

$$\omega^2 = \frac{1}{L_s C_s}, \frac{1}{2}\left(\frac{1}{L_{in} C_p} + \frac{1}{L_p C_1} + \frac{1}{L_s C_s}\right) \pm \\
\sqrt{\left(\frac{1}{L_{in} C_p} + \frac{1}{L_p C_1} + \frac{1}{L_s C_s}\right)^2 - \frac{4}{L_{in} C_p L_p C_1}}$$

(5)

Of these solutions, the first solution corresponds to a resonance frequency of the resonant circuit 20 of the power receiving apparatus 3. Also, the frequency corresponding to the first solution corresponds to the frequency f0 in FIG. 2.

Moreover, as is apparent from Equation (4), the gain G does not depend on the resistance of the load circuit 32 at an angular frequency at which the terminal constant B is zero. Therefore, by setting the drive frequency to a frequency corresponding to an angular frequency at which the terminal constant B is zero or to a frequency in the vicinity thereof, the contactless power feeding apparatus 1 can perform a constant voltage output operation.

Therefore, by setting the drive frequency to a frequency included in a predetermined frequency range including the resonance frequency of the resonant circuit 20, the contactless power feeding apparatus 1 can perform a constant voltage output operation, and the power transmission efficiency can also be improved. Note that the predetermined frequency range may be set such that the change in output voltage due to the change in resistance of the load circuit 32 is included in an allowable range of the output voltage in a system on which the contactless power feeding apparatus 1 is mounted, for example.

Moreover, as long as the degree of coupling k between the transmission coil 14 and the receiver coil 21 satisfies a condition $1 \gg k^2$ (e.g., when the degree of coupling k is 0.2 or less), the drive frequency for the contactless power feeding apparatus 1 to perform a constant voltage output operation does not change, even if there is a slight change in the positional relationship between the transmission coil 14 and the receiver coil 21. Therefore, the control circuit 19 of the power transmitting apparatus 2 need not change the cycle time at which on/off of the switching elements 13-1 and 13-2 of the inverter 13 is switched, even if there is a slight change in the positional relationship between the transmission coil 14 and the receiver coil 21.

Furthermore, in order for the inverter 13 to perform soft switching, there is a need to set the delay amount of the phase of a current flowing in the transmission coil 14 relative to the phase of AC power supplied to the transmission coil 14 to an appropriate value. Accordingly, it may be preferable that the resonance frequency (closed loop resonance frequency) Fp of a closed loop constituted by the transmission coil 14, the first capacitor 15, and the second capacitor 16 in the power transmitting apparatus 2 is higher than a drive frequency Fsw. Note that the closed loop resonance frequency Fp is represented by the following equation.

[Equation 6]

$$Fp = \frac{1}{2\pi\sqrt{L_p\left(\frac{C_1 \cdot C_p}{C_1 + C_p}\right)}} \quad (6)$$

Therefore, as a result of the inductance of the transmission coil 14 and the electrostatic capacitances of the first capacitor 15 and the second capacitor 16 being set to satisfy Equation (6), the delay of phase of a current flowing in the transmission coil 14 relative to the phase of the voltage of AC power supplied to the transmission coil 14 is suppressed from being excessively large. As a result, the switching loss in each switching element of the inverter 13 is reduced.

Figure 4:
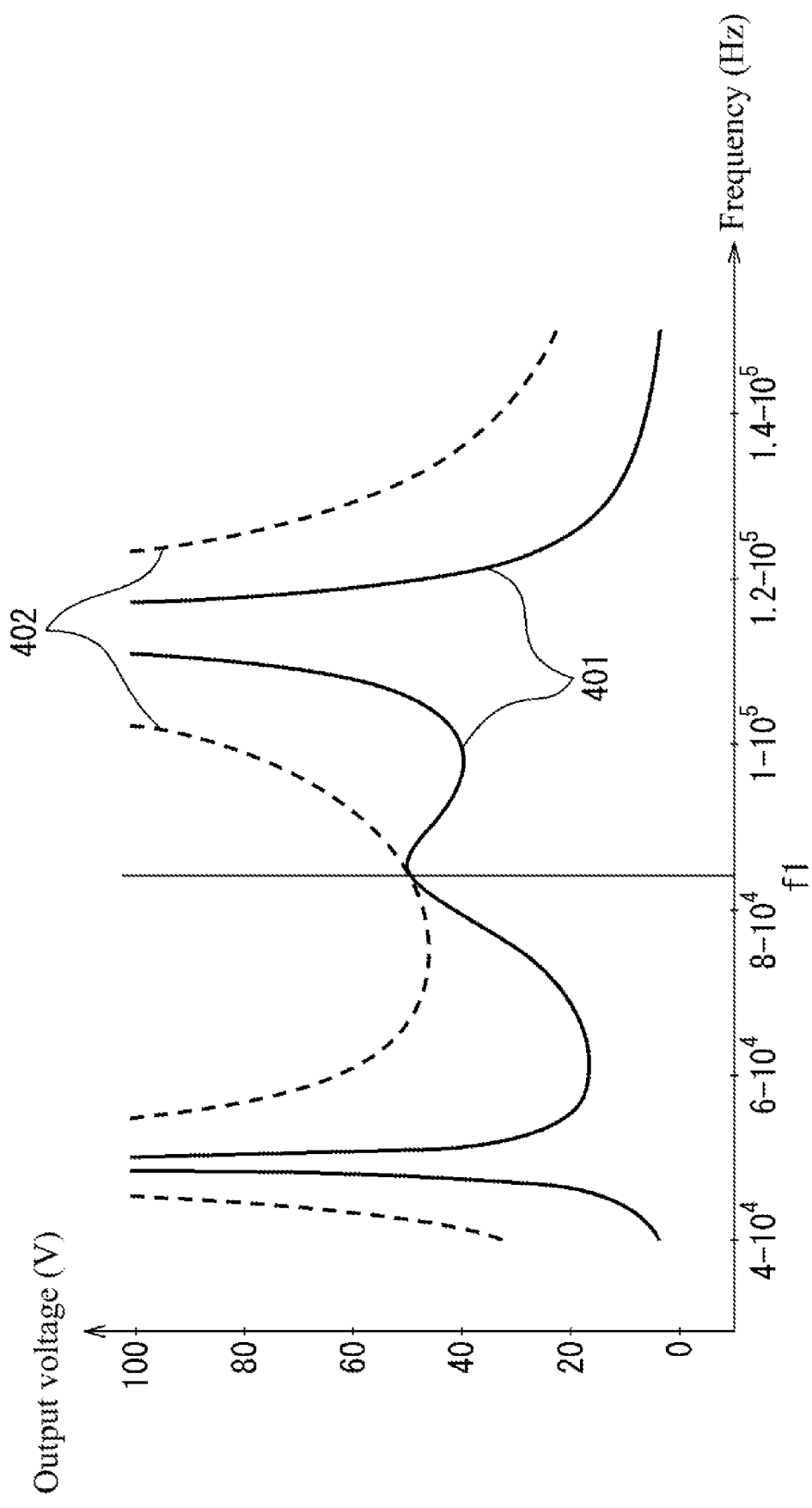
FIG. 4 is a diagram illustrating an example of a simulation result of frequency characteristics of an output voltage of a contactless power feeding apparatus according to one or more embodiments.

FIG. 4 is a diagram illustrating an example of a simulation result of frequency characteristics of the output voltage of the contactless power feeding apparatus 1. In FIG. 4, the horizontal axis shows the frequency and the vertical axis shows the output voltage. The following conditions were set in the simulation underlying the illustrated simulation result. The electrostatic capacitance $C_1$ of the first capacitor 15 was set to 40.1 nF, and the electrostatic capacitance $C_p$ of the second capacitor 16 was set to 45.6 nF. Also, the inductance $L_{in}$ of the first coil 17 was set to 70.0 µH. Moreover, the inductances of the transmission coil 14 and the receiver coil 21 were each set to 160 µH. Furthermore, the electrostatic capacitance $C_s$ of the resonance capacitor 22 was set to 22.4 nF. Also, the winding wire resistance value on the power transmitting side and the winding wire resistance value on the power receiving side were each set to 0.13Ω. Moreover, the voltage $V_{in}$ of AC power output from the inverter 13 was set to 440 V. A graph 401 shows frequency characteristics of the output voltage when the degree of coupling k between the transmission coil 14 and the receiver coil 21 was set to 0.11, and the AC-equivalent resistance value of the load circuit 32 was set to 20Ω. Also, a graph 402 shows frequency characteristics of the output voltage when the degree of coupling k was set to 0.11, and the AC-equivalent resistance value of the load circuit 32 was set to 2 kΩ. As shown in the graphs 401 and 402, it is understood that, at the resonance frequency f1 (=84.1 kHz) of the resonant circuit 20, the output voltage is kept constant, even if the AC-equivalent resistance value of the load circuit 32 changes. Furthermore, it is understood that, at the resonance frequency f1, the output voltage is at the maximum value in the frequency characteristics, and the change in output voltage relative to the change in frequency is smoother than at other frequencies at which the output voltage is at the maximum value. Therefore, it is understood that, by setting the drive frequency fsw to a frequency in a predetermined range including the resonance frequency f1 of the resonant circuit 20, the contactless power feeding apparatus 1 can perform a constant voltage output operation, and the power transmission efficiency can also be improved.

As described above, in the contactless power feeding apparatus, the power transmitting apparatus is configured to include the first coil and the first capacitor that are connected in series between the inverter of the power supply circuit and one end of the transmission coil, and a second capacitor that is connected at one end to a node between the first coil and the first capacitor, and is connected at the other end to the other end of the transmission coil. Also, by setting the drive frequency to be supplied to the transmission coil in a predetermined frequency range including a resonance frequency of the resonant circuit of the power receiving apparatus, the contactless power feeding apparatus can improve the power transmission efficiency while enabling a constant voltage output operation.

Figure 5:
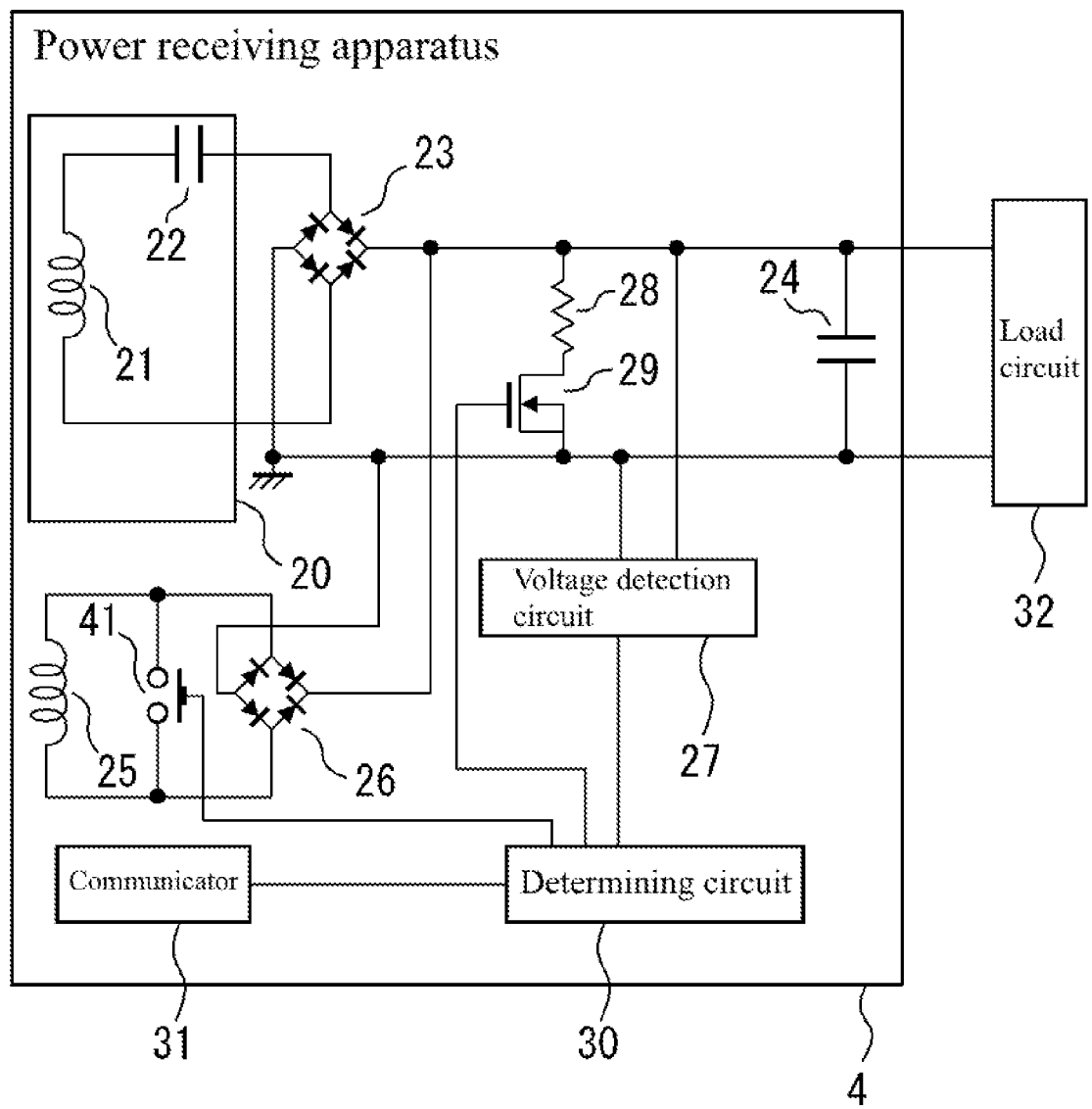
FIG. 5 is a schematic configuration diagram illustrating a power receiving apparatus according to one or more embodiments in a modification.

FIG. 5 is a schematic configuration diagram of a power receiving apparatus according to a modification. A power receiving apparatus 4 according to the modification differs from the power receiving apparatus 3 shown in FIG. 1 in that a switch circuit 41 for switching between short-circuiting and not short-circuiting/releasing? of the subcoil 25 is included, and the determining circuit 30 controls on/off switching of the switch circuit 41. Therefore, in the following, the switch circuit 41 and related portions thereof will be described. Regarding the other constituent elements of the power receiving apparatus 4, descriptions of the corresponding constituent elements in the above-embodiment or embodiments should be referred to.

The switch circuit 41 includes a relay or a MOS FET, for example. One end of the switch circuit 41 is connected to a node between one end of the subcoil 25 and one terminal on the input side of the second rectifier circuit 26, and the other end of the switch circuit 41 is connected to a node between the other end of the subcoil 25 and the other terminal on the input side of the second rectifier circuit 26. Note that it may be preferable that, when the switch circuit 41 is constituted by a MOS FET, the switch circuit 41 includes two MOS FETs connected in series such that the body diodes thereof are formed in opposite directions.

The determining circuit 30 compares the measured value of the output voltage obtained by the voltage detection circuit 27 with an upper limit threshold value (first upper limit threshold value), and switches the switch circuit 41 on/off according to the comparison result. That is, the determining circuit 30, when the measured value of the output voltage increases to the upper limit threshold value or more, short-circuits the subcoil 25 by turning on the switch circuit 41, and, when the measured value of the output voltage falls below the upper limit threshold value, releases the short-circuiting of the subcoil 25 by turning off the switch circuit 41. Note that it may be preferable that the upper limit threshold value is set to a value higher than the voltage applied to the load circuit 32 when the contactless power feeding apparatus performs a constant voltage output operation, in particular, a voltage higher than the upper limit value of an allowable range. Note that the determining circuit 30 may notify the communicator 18 of the power transmitting apparatus 2 of the fact that the measured value of the output voltage has increased to the upper limit threshold value or more via the communicator 31. Accordingly, the control circuit 19 of the power transmitting apparatus 2 may, upon receiving a notification that the measured value of the output voltage has increased to the upper limit threshold value or more from the communicator 18, control the power factor improvement circuit 12 so as to reduce the voltage of AC power to be supplied from the power supply circuit 10 to the transmission coil 14.

When the switch circuit 41 is turned on and the subcoil 25 is short-circuited, the resonance frequency of the resonant circuit 20 changes. Therefore, even if the output voltage of the resonant circuit 20 has excessively increased, short-circuiting the subcoil 25 results in a decrease in the power to be transmitted from the power transmitting apparatus 2 to the power receiving apparatus 4, and therefore the output voltage of the resonant circuit 20 decreases. Therefore, according to the above described modification, the contactless power feeding apparatus can suppress an increase in the voltage applied to the receiver coil 21 due to the change in the degree of coupling between the transmission coil 14 and the receiver coil 21. Therefore, the contactless power feeding apparatus can prevent the power receiving apparatus or the load circuit from failing due to an excessive increase in the output voltage of the resonant circuit.

According to another modification, when the positional relationship between the transmission coil 14 and the receiver coil 21 is ensured by the structures of a device on which the power transmitting apparatus 2 is to be mounted and a device on which the power receiving apparatus 3 is to be mounted such that an excessive voltage will not occur in the power receiving apparatus 3, the subcoil 25 and the second rectifier circuit 26 may be omitted. Accordingly, the circuit configuration of the power receiving apparatus 3 is simplified.

Also, it may be possible that the degree of coupling k between the transmission coil 14 and the receiver coil 21 is not constant, and the degree of coupling k changes every time power is transmitted or during power transmission, and the degree of coupling k may take a large value such that the constraint condition of 1>>k2 is not satisfied. In such a case, the control circuit 19 of the power transmitting apparatus 2 may search for a drive frequency at which the contactless power feeding apparatus 1 can execute a constant voltage output operation by adjusting the drive frequency. Accordingly, if the output voltage went out of the allowable range, the determining circuit 30 of the power receiving apparatus 3 notifies the power transmitting apparatus 2 of the information indicating that the output voltage is not constant via the communicator 31, until the output voltage becomes substantially constant while changing, in a pseudo manner, the load connected to the power receiving apparatus 3 by switching the switching element 29 on/off. A configuration may be adopted in which, during the period in which information indicating that the output voltage is not constant is received from the power receiving apparatus 3 via the communicator 18, the control circuit 19 changes the drive frequency by changing the on/off switching cycle of the switching elements of the inverter 13, and at a point in time in which the power transmitting apparatus 2 ceases to receive such information, the control circuit 19 keeps the drive frequency constant at the current drive frequency.

According to yet another modification, in the power transmitting apparatus 2, the connection positions of the transmission coil 14, the first capacitor 15, the second capacitor 16, and the first coil 17 to the inverter 13 are not limited to those in the above-described example.

Figure 6:
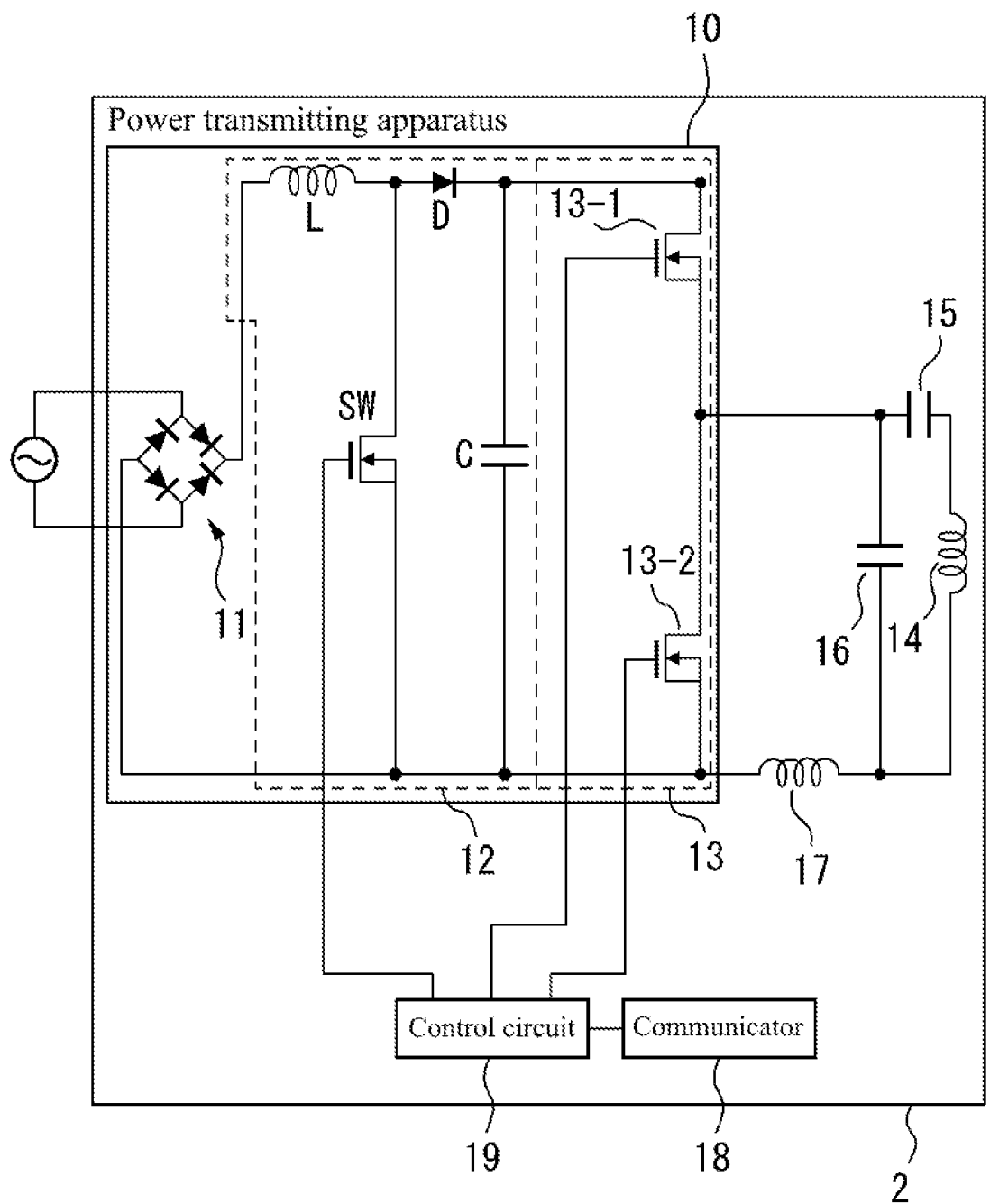
FIG. 6 is a diagram illustrating an example of a connection position relationship between an inverter, a transmission coil, a first capacitor, a second capacitor, and a first coil in a power transmitting apparatus according to one or more embodiments in a modification.
Figure 7:
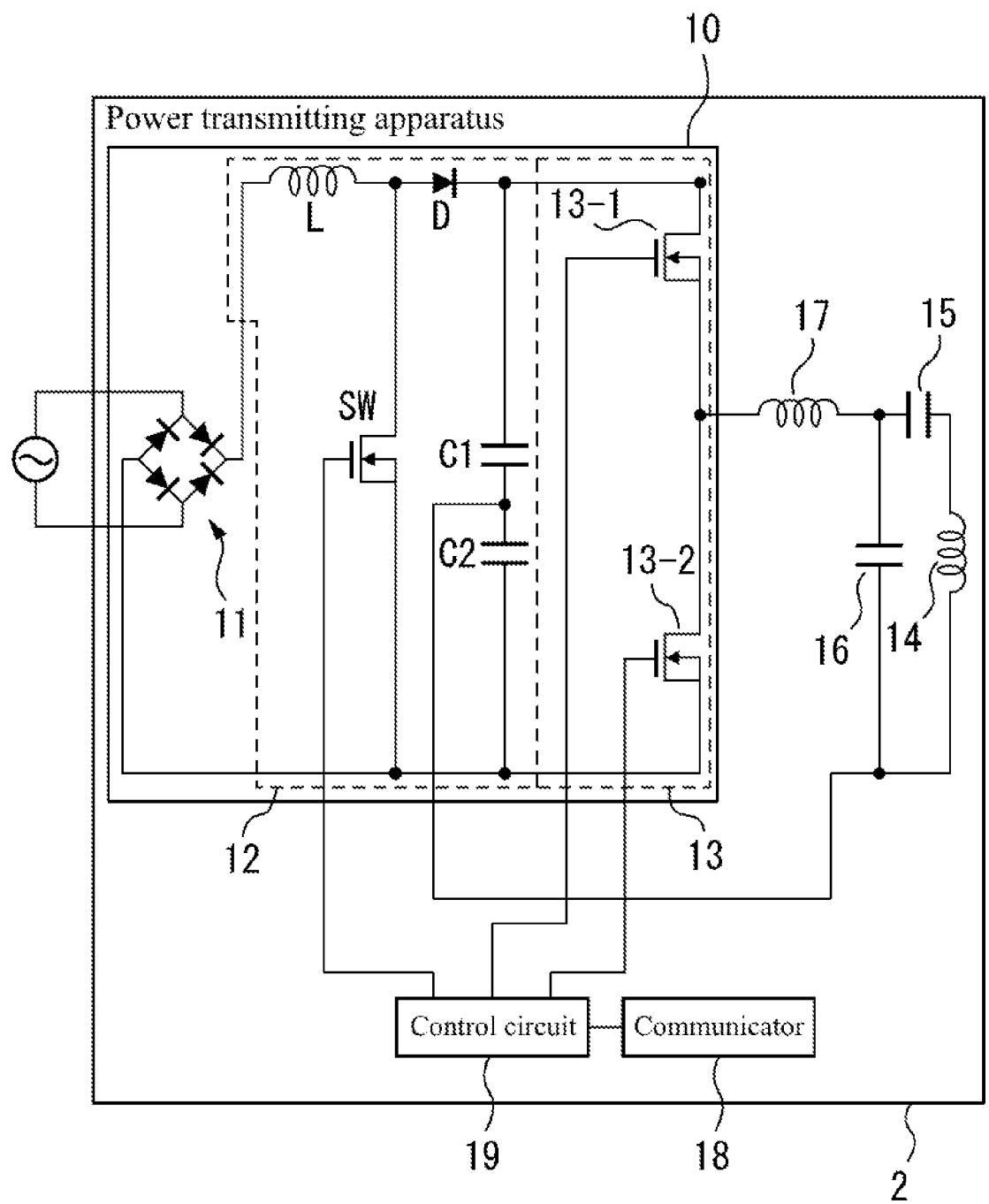
FIG. 7 is a diagram illustrating an example of a connection position relationship between an inverter, a transmission coil, a first capacitor, a second capacitor, and a first coil in a power transmitting apparatus according to one or more embodiments in another modification.
Figure 8:
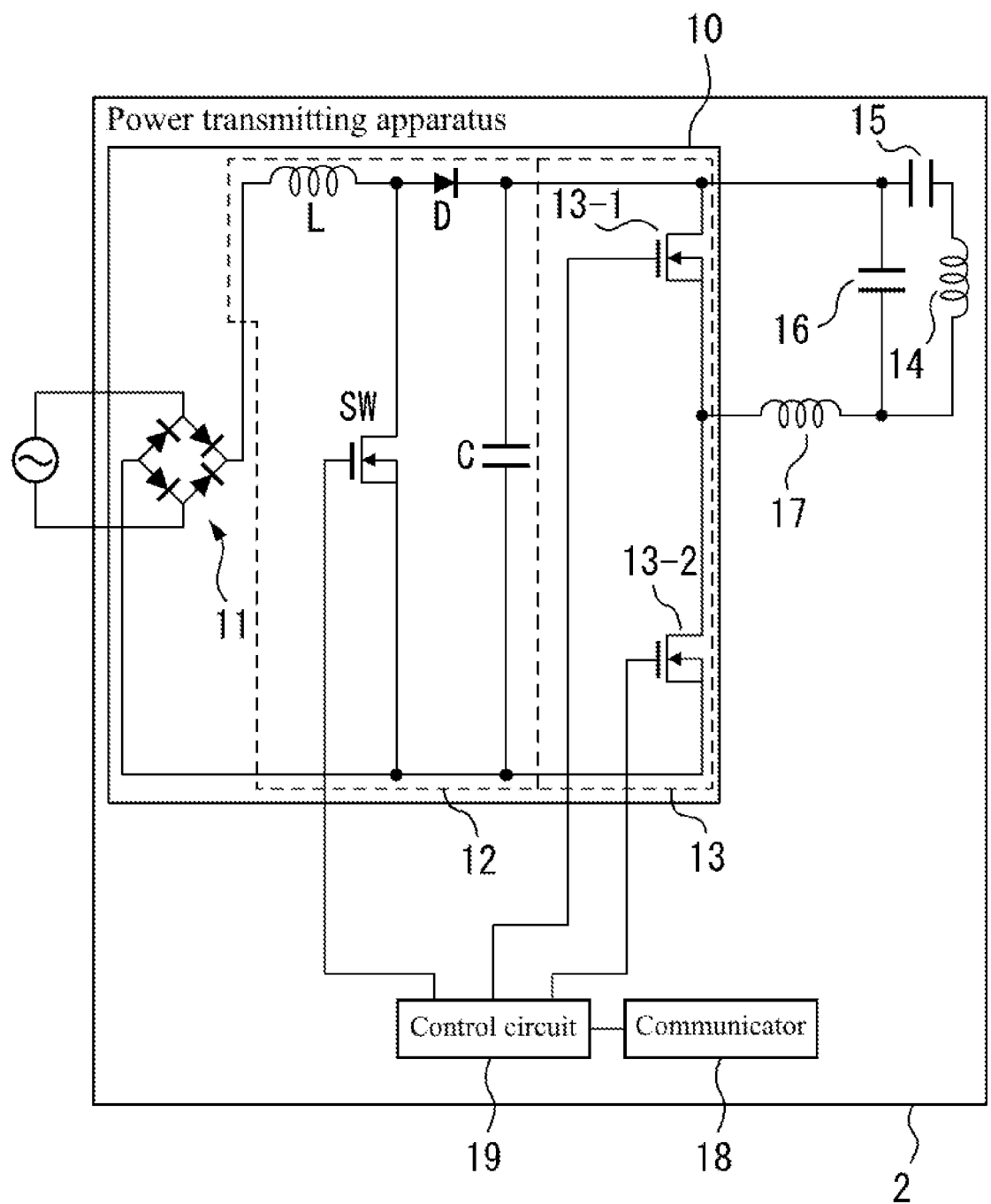
FIG. 8 is a diagram illustrating an example of a connection position relationship between an inverter, a transmission coil, a first capacitor, a second capacitor, and a first coil in a power transmitting apparatus according to one or more embodiments in yet another modification.

FIGS. 6 to 8 are diagrams illustrating examples of the connection position relationship between the inverter 13, the transmission coil 14, the first capacitor 15, the second capacitor 16, and the first coil 17 in a power transmitting apparatus 2 according to the modification. Note that, in the following, the points that differ from the power transmitting apparatus 2 in one or more embodiments described above will be described.

In an example shown in FIG. 6, the first coil 17 is connected, between the transmission coil 14 and the inverter 13, on a side opposite to the side on which the first capacitor 15 is connected. That is, the first coil 17 is connected between one end of the transmission coil 14 on an opposite side to the other end to which the first capacitor 15 is connected and the source terminal of the switching element 13-2 of the inverter 13.

In an example shown in FIG. 7, the power factor improvement circuit 12 includes two smoothing capacitors C1 and C2 that are connected in series. Also, one end of the transmission coil 14 on an opposite side to the other end to which the first capacitor 15 is connected, and one end of the second capacitor 16 on an opposite side to the other end to which the first capacitor 15 is connected are connected to a node between the smoothing capacitor C1 and the smoothing capacitor C2.

In an example shown in FIG. 8, similarly to one or more embodiments described above, the first coil 17 is disposed such that one end is connected to a node between the two switching elements 13-1 and 13-2 of the inverter 13, and the other end is connected to one end of the transmission coil 14. On the other hand, the other end of the transmission coil 14 is connected to the drain terminal of the switching element 13-1 via the first capacitor 15.

With these modifications, effects similar to those of one or more embodiments described above can be obtained.

As described above, a person skilled in the art can perform various modifications according to modes to be implemented, within a scope.

The invention claimed is:

1. A contactless power feeding apparatus comprising a power transmitting apparatus and a power receiving apparatus to which power is contactlessly transmitted from the power transmitting apparatus, wherein
    the power transmitting apparatus comprises:
        a transmission coil for supplying power to the power receiving apparatus;
        a power supply circuit configured to supply AC power having a predetermined drive frequency to the transmission coil;
        a first capacitor connected between the power supply circuit and a first end of the transmission coil;
        a first coil connected between the power supply circuit and the first end or a second end of the transmission coil;
        a second capacitor connected at a first end to the first capacitor, and connected at a second end to the first end of the transmission coil; and
        a control circuit configured to control the power supply circuit such that AC power having the drive frequency is supplied to the transmission coil,
    the power receiving apparatus comprises a receiver coil for receiving power via the transmission coil of the power transmitting apparatus, and a resonant circuit comprising a resonance capacitor that resonates together with the receiver coil, and
    the control circuit is configured to control the drive frequency of the power supply circuit such that the drive frequency falls within a predetermined frequency range comprising a resonance frequency of the resonant circuit and the drive frequency is set within the predetermined frequency range to a frequency corresponding to a frequency at which a constant voltage output operation is performed based on settings of an electrostatic capacitance of the first capacitor, an electrostatic capacitance of the second capacitor, and an inductance of the first coil.

2. The contactless power feeding apparatus according to claim 1, wherein, in the power transmitting apparatus, an inductance of the transmission coil, the electrostatic capacitance of the first capacitor, and the electrostatic capacitance of the second capacitor are set such that a closed loop resonance frequency of a closed loop constituted by the transmission coil, the first capacitor, and the second capacitor is higher than the drive frequency.

* * * * *